United States Patent Office 3,072,968
Patented Jan. 15, 1963

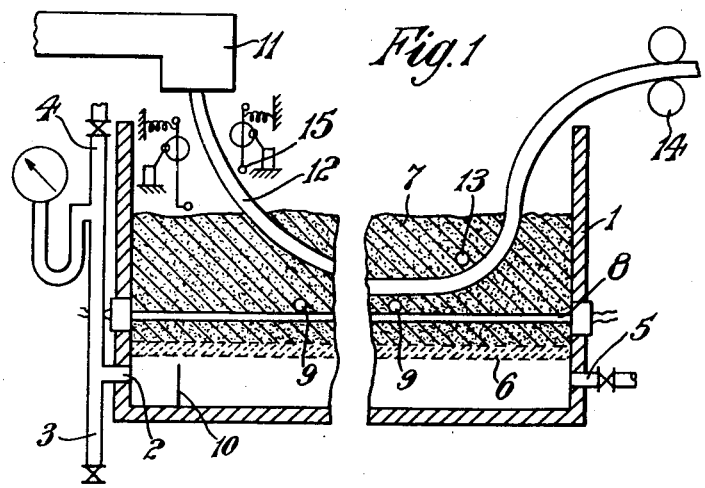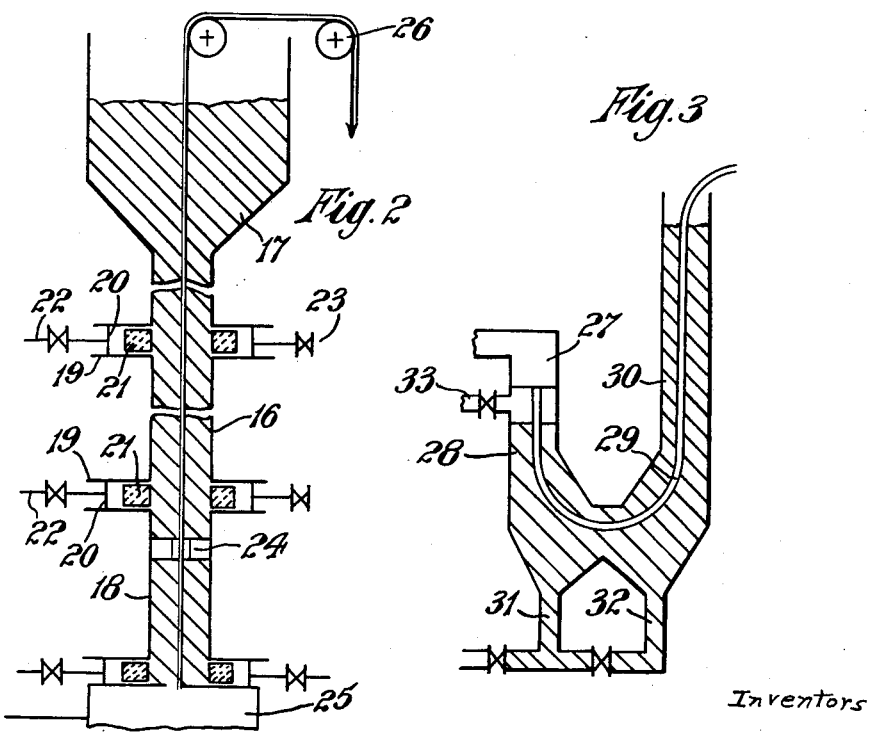

3,072,968
HEAT TREATMENT OF RUBBER
William Ferguson Watson, Mayfield Drive, Shrewsbury, Donald Alfred William Izod, Shawbury, Shrewsbury, and Brian Geoffrey Hughes, Bicton, Shrewsbury, England, assignors to Rubber and Plastics Research Association of Great Britain
Filed Oct. 31, 1960, Ser. No. 66,154
Claims priority, application Great Britain Nov. 11, 1959
8 Claims. (Cl. 18—53)

This invention relates to heat-treatment for the purpose of vulcanisation of rubbers. By the term rubber is meant both natural and synthetic rubbers, for which heat-treatment is used in processing from the raw rubber state to the finished vulcanised product. Included therefore are natural and synthetic cis-polyisoprenes; copolymers of styrene and butadiene, acrylonitrile and butadiene, and isobutylene and isoprene; cis-polybutadiene; neoprene; polyurethane and polyether elastomers; polyethylene-propylene copolymeric elastomers; silicones and fluorinated hydrocarbon elastomers and modifications thereof such as "superior processing" natural rubber and partially vulcanised styrene-butadiene rubber. The rubber is normally used in the form of a mixture which can contain filler material, vulcanising ingredients, e.g. sulphur and accelerators, antioxidants and antiozonants.

Vulcanisation of rubber is at present mainly carried out by heating, using metal-to-rubber contact as in a mould or gas-to-rubber contact with or without pressure as in an oven to steam pan, or liquid-to-rubber contact as in a hot liquid bath. When the product is of such a design that vulcanisation in a mould is economically undesirable, one of the other methods has hitherto necessarily been used but these have certain disadvantages. Vulcanisation by means of gas at a high pressure requires careful sealing, gases at atmospheric pressure have poor heat transfer to the rubber, while liquids at high temperature may be unpleasant to handle and can contaminate the product.

The object of the invention is to provide a method of and apparatus for heat-treatment for vulcanisation which does not necessarily require careful sealing, does not necessarily involve materials which are unpleasant to handle or which cause contamination of the rubber, and does not have disadvantages arising from poor heat transfer.

According to the invention, the rubber is vulcanised by bringing the vulcanisable rubber mixture into contact with a heated bed of finely-divided solid material which is continuously agitated and made mobile by a stream of gas (hereafter referred to as a fluidised bed).

The fluidised bed may be operated in one or more sections where desirable, e.g. a first section may contain a solid selected for good fluidisation and heat transfer properties while a second section may contain a solid selected for a desirable surface effect or for heating or cooling to another temperature.

The solid material may be an finely-divided material capable of substantially maintaining its original physical state at the temperature required for the heat-treatment. It should preferably have good heat transfer properties. It may be selected for some desirable surface effect upon the rubber; for example, talc may be used where it is desired to reduce the surface tackiness of a sticky material, or if, after pre-heat-treatment of the unvulcanised rubber, a tacky surface is required for build-up purposes (for example in footwear construction) a material may be used which will be incorporated or dissolved in the rubber at the vulcanisation temperature. A material in this latter category is zinc stearate.

Preferably, the material has an even particle size distribution; materials consisting of small glass spheres of approximately uniform size and of sand of approximately uniform particle size are especially suitable. Particles of average size between 0.002 and 0.1 inch are especially convenient in giving suitable fluidisation for the purpose of the invention. The solid material is fluidised by the passage of gas which may be air, steam, nitrogen, carbon dioxide or other convenient gas, and the gas may be re-circulated by suitable pumping means. Usually, the gas is heated prior to passage through the solid medium although other means of heating the solid medium can be employed in addition to or alternative to the gas as is described below.

The surface of the particles of the solid material may be treated to render them water-repellent, which may be advantageous when steam is used as the fluidising gas. When steam, which may be superheated, is used, it is necessary to include a water separator and it is desirable to start up and finish off the fluidisation with a gas, e.g. air, which does not readily condense to a liquid, in order to avoid wetting of the solid.

Dry steam superheated to within a few degrees of the operating temperature may be used. This will allow for more even temperature control of the fluidised bed due to a reduction in the temperature gradient between the fluidised bed and the incoming fluidising gas. A suitable superheating apparatus may consist of heated coils of pipe through which steam is passed. High pressure steam may be used through a reducing valve.

The fluidised material is contained in a vessel of any convenient shape which may comprise, for example, a horizontal trough; a substantially vertical column, i.e. a column ensuring a vertical flow of gas; or a U-tube. When a vertical column or a U-tube is used, it may be flared or stepped to provide an upwardly-increasing cross-sectional area so as to give a smoother movement of the solid material. Likewise the trough may be of any convenient shape and dimensions. The gas may be introduced through tubes of cross-section less than one square inch or through distributors such as plates or tiles of even porosity. Alternatively, the porous tiles or plates can extend across the whole base of the trough or column so as to provide an even distribution of gas throughout the solid material.

The distributors may be sealed into the vessel using a refractory cement, for example, or, preferably, to combat differential heat expansion, a flexible sealant, for example, silicone rubber. When a substantially-vertical column is used distributors are provided at the bottom of the column and at intervals up the column. Examples of distributors are porous rings, tiles set in the column wall, or candle-type distributors.

The pressure of gas on its exit from the fluidised bed may be atmospheric or some higher value, normally less than 2 atmospheres. The inlet pressure is higher than at the exit by an amount sufficient to cause the required gas flow for fluidisation of the solid particles, and is usually less than 2 atmospheres. In many practical applications the inlet pressure of a horizontal trough or the hydrostatic pressure at the base of a vertical column is up to 20 p.s.i. above atmospheric pressure. This feature of the invention greatly reduces or eliminates porosity of the vulcanised rubber product in many cases.

The fluidised bed may be heated in addition to, or alternative to, the heat supplied by the gas, by electric elements immersed in it or arranged outside the container for the material, or by means of steam coils immersed in the bed, or by a steam jacket, or other convenient means. The temperature to which the bed is heated depends on the nature of the rubber mixture but generally should not be less than the vulcanization temperature of the mixture.

The invention is applicable to non-continuous vulcanization, in which case it offers the advantage of a high temperature dry bath of high heat transfer into which articles may be placed, or through which they may be drawn by a suitable conveyor, and from which they may be removed without the large heat losses associated with steam vessels, from which much of the heat is lost on opening to re-charge.

The invention is particularly applicable to continuous vulcanization of unsupported extrusions which have hitherto mainly been treated by batchwise processes. It may also be applied to extrusions such as those used for draught sealing, which involve controlled expansion during vulcanisation by the incorporation of a gas-producing material ("blowing agent") in the rubber mixture, due regard being taken to the blowing agent and the pressure within the bed. It may also be applied to extrusions such as those produced for the manufacture of polyurethane and polyether thread.

Continuous vulcanisation of extrusions may be carried out according to the invention in a horizontal trough containing a heated fluidised bed with a duffusing plate or plates in the bottom of the trough, fluidising gas being admitted through ports beneath the diffusing plate. The trough may be constructed as a single unit, or may be of any number of sections to give the required length. An extruder head feeds an extrusion into the heated bed through which it passes to the other end of the trough where it is withdrawn, fully vulcanised. The direction of movement of the extrusion in the fluidised powder may be changed or reversed in order to reduce the length of the trough for the same amount of heating. Alternatively, the extruder head may feed the extrusion into one leg of an approximately U-shaped tube, the extrusion travelling down this leg and up the other leg to be withdrawn at the top, the U-shaped tube being filled with solid material which is fluidised by gas admitted at the bottom of the tube.

Another convenient design is to have an extruder head arranged to extrude upwards either vertically or at an acute angle to the vertical into a substantially vertical column. This offers the advantage of a fluidised bed in which the extrusion is, on entry, subjected to pressure, this pressure depending on the height of fluidised powder in the column. Circular cross-section of columns is advantageous. The column may be attached directly to the extruder or may be separate from it. There may be an iris-type valve in the lower part of the column, which can be closed to support the finely-divided material and to allow for opening of the bottom section. The valve may employ a heat-resistant fabric, for example, nylon or woven polytetrafluoroethylene to form the iris and close round the extruded section.

Referring to the accompanying drawing,

FIGURE 1 is a diagrammatic longitudinal section of one form of apparatus according to the invention.

FIGURE 2 is a diagrammatic illustration of an apparatus using a vertical column.

FIGURE 3 shows diagrammatically an apparatus using a U-tube.

In FIGURE 1, there is an elongated metal trough 1, having an inlet 2 in its lower part at one end for compressed air and steam supplied through pipes 3 and 4 respectively and drain 5 at its other end. Above the inlet 2 and drain 5 is mounted a horizontal layer 6 of porous ceramic tiles, which supports a layer 7 of finely-divided material such as sand. An electric heating element 8 extends through the lower part of the layer 7 and thermostatic controls 9 are provided to control the temperature. A baffle 10 is provided to direct the air and steam on to the under side of the tiles 6.

Above the inlet end of the trough 1 there is an extruder head 11, the extrusion 12 from which is led through the sand layer 7 and under a guide 13 to a haul-off mechanism 14 above the other end of the trough 1. The extrusion 12 leaving the head 11 passes between feelers 15 which actuate devices for controlling the haul-off mechanism 14 so as to keep the haul-off speed equal to the speed of extrusion.

Mechanical feelers may cause distortion of tube and small cross-section extrusions and consequently these may be replaced by two photocells placed in suitable positions. The mode of operation can be as follows. If the extrusion speeds up with respect to the haul-off, the rear photocell is shadowed causing a relay and time delay switch to operate. The delay switch will operate a speed-controlling motor for a pre-set time to increase the haul-off motor speed. If the haul-off motor is running at too high a speed the forward photocell becomes shadowed and operates a further relay which reverses the direction of the speed-controlling motor for a pre-set time, thus reducing the haul-off speed.

In one example of the operation of this apparatus, air at a pressure of 1 p.s.i. is admitted at the rate of 5 cubic feet per minute per square foot of the area of the tile layer 6, whereby fludisation of the sand layer 7 is obtained. When the sand is fully fluidised, the heater 8 is switched on and the temperature of the sand is raised to 160° C. Then the air supply is shut off and steam at 1 p.s.i. is supplied at the same rate. The extrusion of the rubber is then started and the speed is adjusted so that the time of passage through the sand layer is 3 minutes, the rubber being suitably compounded to ensure that vulcanisation is complete in this time. When the extrusion has been completed, the steam is shut off and air is again blown through the sand layer to remove steam which might otherwise condense and cause waterlogging of the sand.

FIGURE 2 shows an apparatus comprising a tubular column 16, which consists of four 6 foot lengths of 3 inch diameter steel pipe, a hopper 17 with a tubular lower end, and a short bottom pipe section 18. The various sections have flanges 19, the flanges of adjacent sections being spaced apart by rings 20 and having between them annular rings 21 of porous ceramic material, the inner surfaces of the rings 21 being flush with the bore of the column 16. Each ring 20 is fitted with a gas inlet 22 and an outlet 23 for bleeding off if necessary to prevent slugging. In the short bottom section 18 there is a full-bore shut-off valve 24 of the iris diaphragm-type with a tile assembly immediately above it. The column is mounted vertically on the cross-head of an extruder 25, with a porous ring assembly at the bottom of the column, and the extrusion is drawn vertically up the column by a haul-off gear 26 in conjunction with a feed wire through the extruder cross-head which may incorporate an automatic speed changing device to compensate for alterations in extrusion speed. The column is filled with small glass spheres, sand, or similar material which is fluidised by means of gas admitted through the porous rings 21. The valve 24 makes it possible to obtain access to the extruder without first emptying the column. The column may be provided with a heating jacket, or with electrical tape heating elements.

In one example of the operation of this apparatus containing Redhill H sand to a depth of 20 feet, nitrogen at a pressure of not less than 20 p.s.i. is forced into the column through the bottom tile at a flowmeter indicated rate of ¾ cubic feet per minute, thereby fluidisation of the sand is obtained after a minute or so. Slugging can be largely eliminated by bleeding off a proportion such as ¼ cubic feet per minute from the third tile up. When a pressure of 13–15 p.s.i. is reached at the bottom of the column, the sand is fully fluidised. The heating means is then started and the temperature of the sand raised to 160° C. The gas supply is transferred to the tile immediately above the diaphragm valve, the valve closed and the bottom section opened. After running out the sand the take-off wire can be attached to the extrusion. The section is closed, the valve opened and fluidisation re-established from the bottom. The lost sand can be added to the top of the column. Extrusion of the rubber is then started and the speed adjusted so that the time of passage through the column is 3 minutes, the rubber being suitably compounded to ensure that vulcanisation is complete in this time.

FIGURE 3 shows an arrangement in which an extruder head 27 extrudes into the shorter leg 28 of a U-tube, the extrusion 29 passing through the tube and being drawn off from the top of the longer leg 30. The tube is filled with finely-divided material such as glass spheres or sand, which is fluidised by gas admitted through pipes 31, 32 leading into the bend of the U-tube. A branch 33 is provided at the top of the leg 28 for bleeding off if necessary.

Vulcanisation of rubber mixtures using the method of the present invention can be effected quickly and easily in view of the efficient transfer of heat from the fluidised solid medium to the rubber mixture. Furthermore, the compact and relatively-small apparatus of the present invention enables factory floor space to be used economically since the need for installation of the large ovens hitherto used is removed.

Having now described our invention, what we claim is:

1. A method of vulcanizing rubber mixtures which comprises:
    establishing a bed of particles of finely divided solid material;
    maintaining the particles of said material in fluid suspension by passing a gas upwardly through said bed;
    controlling the pressure of said bed by regulating the height of said bed and the pressure of the fluidizing gas admitted thereto;
    heating the particles in said bed and maintaining them at an elevated temperature;
    passing a vulcanizable rubber mixture through said heated bed of finely divided particles in suspension until the rubber mixture is heated to the vulcanization temperature and is vulcanized.

2. A method according to claim 1 in which the finely-divided solid material has a particle size between 0.002 and 0.1 inch.

3. A method according to claim 1 in which the vulcanizable rubber mixture is continuously extruded into the bed, drawn through the bed, and vulcanized as it is drawn therethrough.

4. A method according to claim 1 in which the vulcanizable rubber mixture is shaped into an article and passed through said bed until vulcanization is completed.

5. A method according to claim 1 in which the bed of finely-divided solid material is contained in a horizontal trough and supported on a layer of porous material extending across the trough through which a gas is upwardly passed to maintain the finely-divided material in fluid suspension.

6. A method according to claim 1 in which the finely-divided solid material is contained in a tubular column constructed in sections with a porous ring provided at the bottom of the column and between the sections through which a gas is passed into said column to maintain said solid in fluid suspension.

7. A method according to claim 1 in which the finely-divided solid material is contained in a U-tube provided at the bend with an inlet through which a gas enters said tube to maintain said solid material in fluid suspension.

8. A method of vulcanizing rubber mixtures which comprises passing heated air through a bed of finely-divided solid material to fluidise said material and heat it to the vulcanization temperature, shutting off said air when said bed is fluidised and at said temperature, and passing super-heated steam into said bed to fluidise said material and to maintain it in heated conditions, and while said bed is being fluidised by the passage of super-heated steam therethrough, extruding a rubber mixture of the desired shape into said bed and passing said mixture through said bed to effect the vulcanization of said mixture.

References Cited in the file of this patent

UNITED STATES PATENTS

| | | |
|---|---|---|
| 857,756 | Reddy | June 25, 1907 |
| 1,162,397 | Price | Nov. 30, 1915 |
| 1,311,613 | Munger | July 29, 1919 |
| 2,333,143 | Bennett | Nov. 2, 1943 |
| 2,463,288 | Leguillon | Mar. 1, 1949 |
| 2,971,221 | Schoenbeck | Feb. 14, 1961 |
| 2,971,242 | Doleman et al. | Feb. 14, 1961 |

FOREIGN PATENTS

| | | |
|---|---|---|
| 773,375 | Great Britain | Apr. 24, 1957 |